US007311835B2

(12) United States Patent
Dey et al.

(10) Patent No.: US 7,311,835 B2
(45) Date of Patent: Dec. 25, 2007

(54) METHOD FOR SUPPLYING OXYGEN TO A WATER PURIFICATION PROCESS

(75) Inventors: Estera Szwajcer Dey, Lund (SE); Olof Norrlöw, Helsingborg (SE)

(73) Assignee: Kemira Oyj, Espoo (FI)

( * ) Notice: Subject to any disclaimer, the term of this patent is extended or adjusted under 35 U.S.C. 154(b) by 1 day.

(21) Appl. No.: 10/529,595

(22) PCT Filed: Nov. 20, 2003

(86) PCT No.: PCT/SE03/01797

§ 371 (c)(1), (2), (4) Date: Nov. 16, 2005

(87) PCT Pub. No.: WO2004/048281

PCT Pub. Date: Jun. 10, 2004

(65) Prior Publication Data

US 2006/0151389 A1 Jul. 13, 2006

(30) Foreign Application Priority Data

Nov. 28, 2002 (SE) .................................... 0203529

(51) Int. Cl.
*C02F 3/00* (2006.01)

(52) U.S. Cl. ...................... 210/615; 210/616; 210/617; 210/670; 210/220

(58) Field of Classification Search ........ 210/615–617, 210/220, 670
See application file for complete search history.

(56) References Cited

FOREIGN PATENT DOCUMENTS

WO WO-86/03773 A1 7/1986

OTHER PUBLICATIONS

Database WPI, Week 198737, Derwent Publications Ltd., London, GB; AN 1987-260739.
Voss et al., "Long-term performance of parallel-flow, bubbleless, hollow-fiber-membrane aerators", Water-Environ. Res., vol. 71, No. 1, 1999, pp. 23-30.

*Primary Examiner*—Chester T. Barry
(74) *Attorney, Agent, or Firm*—Birch, Stewart, Kolasch & Birch, LLP

(57) ABSTRACT

The present invention relates to a method for supplying oxygen to a water purification process, said method comprising providing an oxygen carrier of at least one copolymer of dimethylsiloxane, ethylene oxide and propylene oxide, adding said oxygen carrier to the water purifying process, and contacting said oxygen carrier with an oxygen containing gas. The invention further relates to the use of at least one copolymer of dimethylsiloxane, ethylene oxide and propylene oxide, as an oxygen carrier in a water purification process.

11 Claims, 5 Drawing Sheets

METHOD FOR SUPPLYING OXYGEN TO A WATER PURIFICATION PROCESS

TECHNICAL FIELD OF THE INVENTION

The present invention relates to a method for supplying oxygen to a water purification process and to the use of at least one copolymer of dimethylsiloxane, ethylene oxide and propylene oxide, as an oxygen carrier in a water purification process.

BACKGROUND ART

The processing and disposal of wastewater treatment sludge are increasingly important topics of environmental, economical and technological concern. Recently, the waste volumes produced have increased dramatically as a result of increases in the organic loading of wastewater and environmental regulations that require a higher degree of wastewater treatment. After sewage treatment at wastewater plants there is still over 1 million ton sludge produced each year in Sweden. By tradition, this sludge has been spread out on fields as fertilizer, or it has been deposited or combusted. However, many problems have arisen. In 1999 Lantbrukarnas Riksförbund, the farmer's national union in Sweden, warned their members from using sludge as fertilizer as they suspected the sludge to contain hazardous substances. Disposal by land filling is also becoming increasingly expensive. The growing and closing of landfills, public concerns over ground-water contamination and safety problems associated with methane production as a result of biological activity in landfills further expand the problem. Public concern over possible hazardous products through combustion processes such as dioxins and possible heavy metal contamination from the resulting ash is also problematic. Therefore a new waste tax was introduced in January 2002 to encourage researchers to find a better solution. By year 2005, the situation becomes even more critical as by then it will be completely illegal to deposit organic material as sludge. Therefore, the problem with the great amount of sludge mass is urgent today.

Certain wastewater treatment methods comprise biological techniques, such as aerobic treatment, anaerobic treatment, and other anoxic processes (denitrification, sulphate reduction). The biological techniques clearly have the greatest potential for treating wastewater. Biological processes can be used to remove and/or recover biodegradable organic compounds, nitrogen, phosphorus and sulphuric compounds, pathogenic organisms and various heavy metals.

Biological processes are used extensively in the treatment of domestic and industrial wastewater. The quality of the effluent water depends on effective removal of the pollutants by metabolic activity of the aerobic microorganisms. The activity depends on the growth rate which is regulated by the dissolved oxygen and medium composition. Aerobic conditions are favouring oxidation of substances responsible for the unpleasant odour of fermented sludge.

Oxygen solubility has always been an important issue in many aerobic fermentation processes, because oxygen unlike other nutrients is sparingly soluble in aqueous media. The mass transfer rate of oxygen from oxygen rich phase to media is often a rate limiting factor in the processes. Therefore oxygen has to be continuously supplied to media to meet the oxygen demand required for actively respiring cells to do the metabolism which will not be effected by the lack of oxygen. Shortage of dissolved oxygen is hampering the biological digestion of sludge and oxidation reaction e.g. nitrification and detoxication of wastewater. Bioremediation of hazardous toxicants such as dioxins and pesticides is oxygen dependant.

Today the lack of oxygen in the biological purification steps is partially solved by supplying oxygen by pumping to these biological steps. This requires a high energy supply which is expensive. However, since there still remains a considerable amount of sludge, which must be deposited and discarded, new means for supplying oxygen to the biological steps are required, so that a more effective digestion is accomplished.

In WO86/03773 there is described a process for increasing the solubility of gases in an aqueous medium and an emulsion for carrying out said process. Said emulsion comprises a copolymer of a silicone and a hydrophilic compound.

Due to the restricted laws regarding disposal of organic material as sludge in the coming years there are urgent needs to develop new means to digest sludge more efficiently. The present invention provides a solution to the above mentioned problem.

SUMMARY OF THE INVENTION

The present invention relates, in one aspect, to a method for supplying oxygen to a water purification process, said method comprising:

a) providing an oxygen carrier of at least one copolymer of dimethylsiloxane, ethylene oxide and propylene oxide;

b) adding said oxygen carrier to the water purifying process; and c) contacting said oxygen carrier with an oxygen containing gas.

The invention relates, in another aspect, to the use of at least one copolymer of dimethylsiloxane, ethylene oxide and propylene oxide, as an oxygen carrier in a water purification process.

DETAILED DESCRIPTION OF EMBODIMENTS OF THE INVENTION

In an embodiment of the invention said copolymer is added as an emulsion, or as a copolymer immobilized on and/or in a support. An emulsion may be used for example for increasing the oxygen content of contaminated waste water, thereby increasing the digestion of heavier material such as sludge. The copolymer may be emulsified in any solvent known to a person skilled in the art, an example being water or any oil. A support immobilized with said copolymer may be used for increasing the oxygen content for bioremediation of the waste.

The oxygen carrier of at least one copolymer of dimethylsiloxane, ethylene oxide and propylene oxide added to the water purifying process may be combined with other known means for increasing the oxygen content in water. A certain water purifying process is not limited to a certain copolymer, but a combination of different copolymers of dimethylsiloxane, ethylene oxide and propylene oxide may be added together or separately to the water purification process.

In a further embodiment said copolymer immobilized on a support further includes immobilized microorganisms thereon. Said support may be selected from the group consisting of organic supports, such as alginate, collagen, glycans, and so on, and non-organic supports, such as ceramics, polystyrene in the form of hollow fiber membranes, and the surfaces of beads. Any support known within the art may be used in connection with the invention and will be apparent to a person skilled in the art. By co-immobilizing the copolymer with microorganisms and oxidative enzymes participating in aerobic processes, the contact of the oxygen carrying copolymer and the microorganisms and oxidative enzymes is facilitated, thereby getting easy access to the required oxygen. The oxidation process is accelerated.

In a yet further embodiment said oxygen containing gas is added to the process either continuously or batch-wise. By continuously adding oxygen to the process the copolymer can continue to function as an oxygen carrier over time. As the oxygen is consumed by the aerobic processes further oxygen can be continued to be supplied to the copolymer. The supplied oxygen gets into contact with the copolymer, being depleted of oxygen, and the copolymer takes up oxygen and continues to act as an oxygen carrier.

In the context of the present invention the wording "oxygen containing gas" refers to any kind of gas containing oxygen, examples being air or pure oxygen gas.

In an embodiment of the invention said copolymer is added to the aerobic steps of the water purifying process. In the present context the wording "aerobic step(s)" is meant to comprise any step(s) of a water purification process in a water purification plant requiring oxygen for the digestion of sludge or any contaminants in the waste water.

In another embodiment of the invention said at least one copolymer comprises 10-40% by weight of dimethylsiloxane, 20-60% by weight of ethylene oxide, and 10-60% by weight of propylene oxide.

In a yet further embodiment said copolymer comprises 15-35% by weight of dimethylsiloxane, 25-45% by weight of ethylene oxide and 20-50% by weight of propylene oxide. Non-limiting examples of copolymers which present satisfactory results in connection with the present invention are a copolymer comprising 18% by weight dimetylsiloxane, 35% by weight ethylene oxide and 46% by weight propylene oxide and a copolymer comprising 33% by weight dimetylsiloxane, 44% by weight ethylene oxide and 23% by weight propylene oxide.

The copolymers are used for supplying the desirable oxygen amount to the microorganisms requiring oxygen for their metabolism, i.e. digestion of sludge. Further, the copolymers are used for transporting other gases, e.g. carbon dioxide, produced in the digestion of the sludge. The copolymers may be added to the aerobic steps of a water purification process in any form, examples being as an emulsion or immobilized on a support. Any form which suits the copolymer may naturally be used in the scope of the present invention. The amount required is generally low and the copolymer is biodegradable. Thus, a further advantage of the invention is that the copolymer degrades after some time and it is not necessary to remove the remainders from the process. Thus, it is only required to add further copolymer to the water purifying process if further purification is needed.

Both agitation and air compression, being used today for supplying oxygen, consume a considerable amount of energy. Therefore, copolymers of dimethylsiloxane, ethylene oxide and propylene oxide can serve as a cheap solution to enhance oxygen levels in aerobic steps in water purification. It is important to select a proper copolymer of dimethylsiloxane, ethylene oxide and propylene oxide, since it has been shown in the present invention that certain copolymers supply oxygen more efficiently than others.

EXAMPLES

Material and Methods

Preparation of Thermistor Based Enzyme Unit

Figure 1:
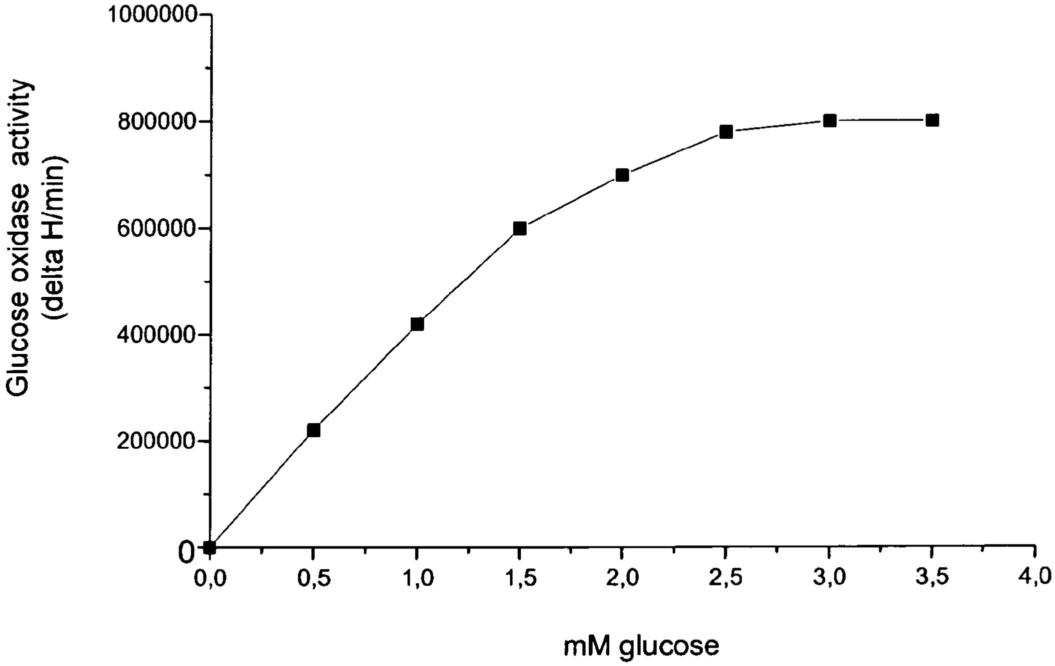
FIG. 1. Oxidation rate of different concentrations of glucose by immobilised glucose oxidase, monitored by thermometric sensor. The Y axis represents the glucose oxidase activity (delta H/min) and the X axis represents the concentration of glucose.

Glucose oxidase (GO) with horseradish peroxidase (HRP) were covalently co-immobilized on amino-controlled-pore glass beads (CPG) by using glutaraldehyde chemistry. CPG was activated with 2.5% glutaraldehyde solution dissolved in phosphate buffer (0.1N, pH 7.0). To 350 mg of activated CPG beads were added 10 U of dialyzed glucose oxidase and peroxidase in phosphate buffer. The coupling of the enzymes was carried out overnight at 4° C. under gentle shaking. Afterwards, in order to terminate all the unreacted groups on the matrix 50 mg ethanol amine (pH 8.5-9.0) was added and allowed to react further for 2 h. Finally, the immobilised enzymes were washed with the (10 vol) phosphate buffer and the beads were transferred into a column (0.7 ml, 2.5 cm×0.7 cm) and assembled into the thermometric system belonging to the unit called enzyme thermistor (ET).

Assay

The reaction velocity is determined by converting the produced heat during the enzymatic oxidation of glucose into electrical signals read as peaks. The size of the integrated peak area is proportional to the concentration of the oxidized glucose. Each new measurement started with standardization of the system using glucose (0.5-3.5 mM).

Preparation of Siloxanes for the Enzymatic Test

Preparation of the running buffer. The running buffer consists of (100 mM) sodium phosphate, pH 7.0 in which (10 mM) 2.4 o-dianisidine was dissolved. Preparation of oxygen carrier emulsion with glucose. In the case when the PDMS copolymer was not water soluble a constant concentration (0.5% w/w) of polypropylene glycol P2000 (PPG P2000) or up to 5% (w/w) Pluronic F 68 (trademark for a series nonionic surface-active agents prepared by the addition of ethylene oxide to the propylene glycols) as emulsifier was used. A given concentration of a PDMS copolymer with or without emulsifier was dissolved in the running buffer and sonicated for 2 minutes in Bronson water bath (40 mHz). Freshly prepared suspension was quickly distributed in 5 ml portions into labeled test tubes pre-filled with a defined glucose concentration. Before the injection into the enzyme thermistor (ET) system each suspension was saturated with pure oxygen for 2 minutes, and (100 μl) was injected into ET which was running at constant flow rate (0.7 ml/min).

Reagents

A 25% aqueous solution of glutaraldehyde, Glucose oxidase (GO type X-S, from *Aspergillus niger* 208 U $mg^{-1}$) and 2.4 o-dianisidine were purchased from Sigma Chemical CO (USA). Peroxidase (HRP) (250 U/mg) was obtained from Biozyme Laboratories. Glucose, yeast extract and bactopeptone (digested casein) were obtained from Merck.(Darmstadt/Germany). Polypropylene glycol P2000 (PPG P2000) was a gift from MB-Sveda/Sweden, and Polydimethyl siloxane (PDMS) co-polymers were kindly obtained from Dow Corning (DC) USA supplied by the distributor in Belgium. Trosoperl controlled-pore glass (CPG) beads with free amino groups (particle diameter 125-140 nm, pore diameter 49.6 nm) were obtained from Schuller (Steinach, Germany). All solutions were prepared with phosphate buffer (sodium phosphate dibasic with sodium phosphate monobasic) 0.1 mol $l^{-1}$ at pH 7.0.

Organisms

*Bacillus thuringiensis*, a laboratory strain and *Streptomyces coelicolor* A3(2) were used in these studies. The *Bacillus thuringiensis* was maintained at 4° C. on LB agar slants, and the inoculum was built by transferring one loop of cells from the agar slant to 100 ml of liquid LB media (500 ml flask). The LB media consist of; yeast extract-0.5%, bactopeptone-1% and NaCL-1%, pH 7.0. *Streptomyces coelicolor* A3(2) was maintained at 4° C. on protein fraction extract (PFE) agar plate and spores were used for preparing a PFE based liquid inoculum.

Cultivation Conditions

The growth was carried out in the 3 L Erlenmeyer flasks filled with LB (1 liter) growth media and supplemented with 0.01-0.1% (w/w) of PDMS copolymer (DC Q2-5247) for *Bacillus* and 0.1-5% for *Streptomyces* and as control no oxygen carrier was added. Each flask was closed with a tight stopper jointed to a gas filter. The gas filters were connected with a plastic tube to a sterile filter and further joined with the main air supply via an Erlenmeyer flask filled with water sacking bottle saturated under controlled flow of air. To keep the cultivation bottles under controlled temperature and agitation, during the growth, they were placed in a water bath with a set temperature and agitation speed. During defined hours by using a sterile syringe up to 50 ml of cell suspension was drawn out for analysis.

Cell count The cell count was carried out for the *bacillus* cell culture. The samples were serially diluted with saline solution (0.9% NaCl). The appropriately diluted samples (0.1 ml) were plated on LB agar plates and incubated at 30° C. for 24 h to form fully developed colonies.

Pigmented Actinorhodin determination Actinorhodin production has been checked out as follows: a known volume of liquid medium with growing bacteria was mixed with 2M KOH and left for 30 min., then centrifuged (10 min., 20000 g). The Actinorhodin content was measured in the supernatant. Absorbance at λ=550 nm was followed by a Hitachi U-3200 UV/VIS spectrophotometer (Kieser et al., 2000).

Screening of PDMS Copolymers by Using Glucose Oxidase/peroxidase Thermosensor

A few commercially available Dow Corning (DC) PDMS co-polymers (table 1) were chosen and screened for their potential to increase the oxidation rate of glucose by using a co-immobilised glucose oxidase/peroxidase where the registration of the enzymatic reaction was combined with the thermal unit known as enzyme thermistor (ET). This study has already indicated that such chemicals have a high potential for increasing oxygen solubility in water and do not kill the enzymes or microbial activity. However, guidelines regarding the proper choice of a commercial product like the size and the proportion of the inbuilt blocks, its capacity to carry oxygen from water to the enzyme or microbial system are missing. As it is shown in FIG. 1, the glucose concentration continues to increase 0.5-1 mM, an increase of reaction rate is observed as first order kinetics (phase 1). As the substrate concentration increases from 1.5-2.0 mM, the increase in the reaction rate begins to slow down, and with a large substrate concentration from 2.5-3.5 mM, no further change in velocity is observed, phase 2 entering the zero-order kinetics. The reasons of the zero-order kinetics in the case of oxidases at this range of glucose is due to the limited concentration of dissolved oxygen.

Different PDMS copolymers (table 1) at concentration range between 0.5 to 25% (w/w) were tested with glucose in the range between 0.5-3.5 mM. The oxidation rate of glucose gets satisfactorily improved when 2.0 mM glucose is combined with 15% of each PDMS copolymer listed in table 1.

Figure 2:
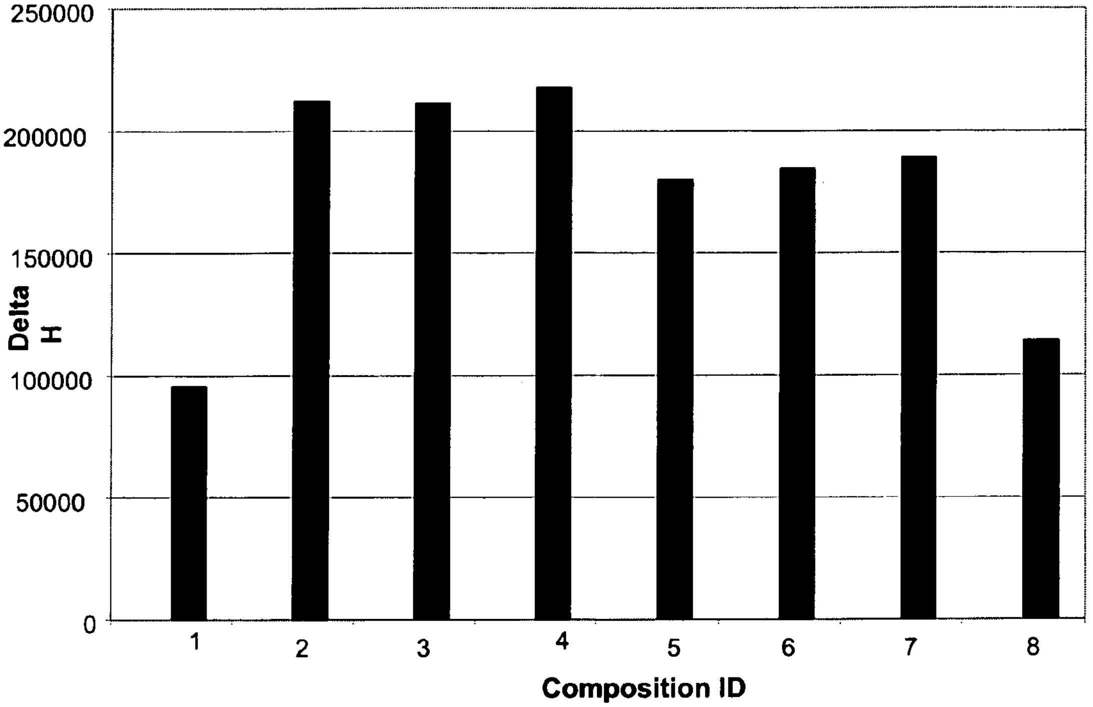
FIG. 2. The effect of the polydimethylsiloxane (PDMS) copolymers, with increasing concentrations of PDMS, on the enzymatic glucose oxidation. The Y axis represents the glucose oxidase activity (Delta H/min) and the X axis represents the identity of the composition. The tested samples are in table 1. In each analyzed sample glucose (2.5 mM) was present. Symbols: 1) no polymer; 2) 15% DC Q2-5247; 3) 0.5% DC1248+15% DC Q2-5247; 4) 5% DC1248+15% DC Q2-5247; 5) 15% DC 1598 ; 6) 0.5% DC1248+15% DC 1598 ; 7) 5% DC1248+15% DC 1598; 8) 15% DC1248+0.5% PPG P2000.

The individual PDMS co-polymer was suspended in water based solutions. In some experiments the PDMS copolymers were combined with polypropyleneglycol P2000 (PPG P2000) or with Pluronic F 68. The choice of these substances was based on the structural similarity to the non PDMS block (table 1). Without glucose, PPG P2000 and Pluronic F 68 at concentration 1 and 5% (w/w) respectively, passed though glucose oxidase sensor without producing a heat signal. The PPG P2000 used at a concentration of 1% (w/w) with 1.5 mM glucose was not effective to improve glucose oxidation, while Pluronic F 68 used at a concentration of 5% (w/w) has less capacity to improve oxygen solubility on its own. To see the role of the block ratio of PDMS on the oxidation of 2.5 mM glucose 15% (w/w) PDMS copolymers were tested (table 1). Another aspect was to see how the increased concentration of PDMS moiety either present in the copolymer structure, or added separately into the water-based solution affects the glucose oxidation rate (FIG. 2). The product DC 1248 that is almost a pure PDMS (table 1) was tested in combination with PPG P2000 (bar 8), DC Q2-5247 (bars 3,4) and DC 1598 (bars 6,7) in FIG. 2. The almost pure PDMS marked DC 1248, added in the amount of 5% (w/w) together with 15% either DC Q2-5247 or DC 1598 shows a neglectable effect.

Figure 3:
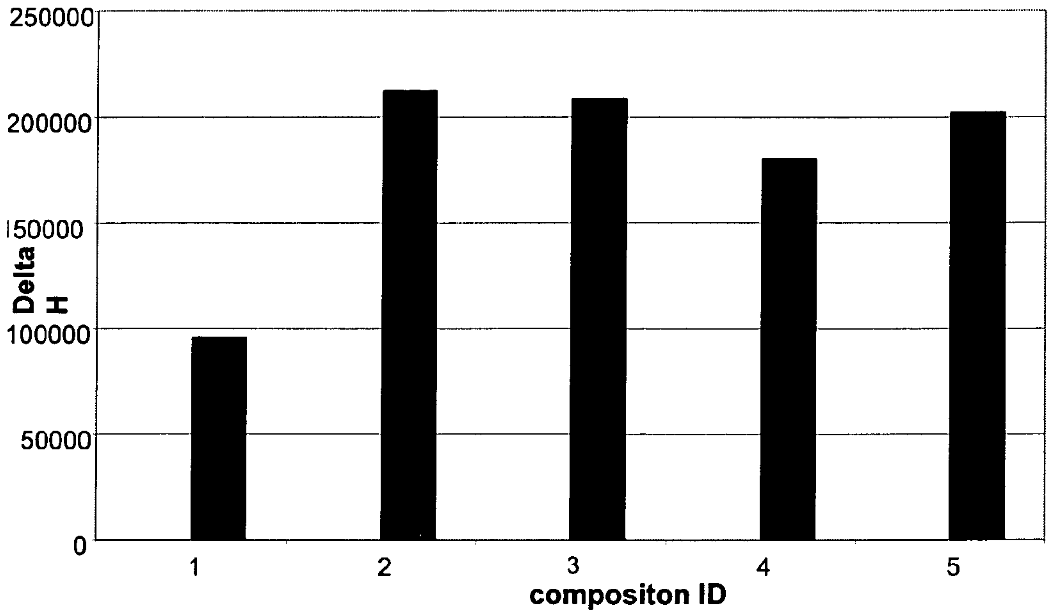
FIG. 3. The role the poly ethylene/propylene block in the PDMS copolymer has on the enzymatic glucose oxidation. The Y axis represents the glucose oxidase activity (Delta H/min) and the X axis represents the identity of the composition. In each analyzed sample glucose (2.5 mM) was present. Symbols: 1) no polymer ; 2) 15% DC Q2-5247; 3) 15% DC Q2-5247+5% pluronic F 68; 4) 15% DC 1598; 5) 15% DC 1598+5% pluronic F 68.

The effect of the non PDMS moiety in tested copolymers is shown in FIG. 3. It is interesting that Pluronic F 68 at 5% (w/w) used together with DC 1598 (bars 4, 5) improves the oxygen carrying capacity of the DC 1598, while similar combination with DC Q2-5247 (bars 2, 3) is not effective at all (FIG. 3). The explanation of these results is the critical role of the PDMS ratio to the EO/PO block. In spite of the fact that PDMS is the key carrier for oxygen, the EO/PO block is the limiting factor for the oxygen carrying capacity.

Thus, a more than 2-fold increase in oxygen carrying capacity was observed with the product containing only 18% DMS (Q2-5247) (FIG. 2, bar 2). Addition of DC 1248 (DMS 96%) to the stimulatory Q2-5247, in increasing proportion, had no effect (FIG. 2, bars 3 and 4). The same result was seen when DC 1248 was added to a copolymer with a higher (33%) DMS content (DC 1598) (FIG. 2, bars 5, 6, 7). The lowest oxygen carrying capacity was represented by DC 1248 (DMS content 96%) (FIG. 2, bar 8).

Figure 4:
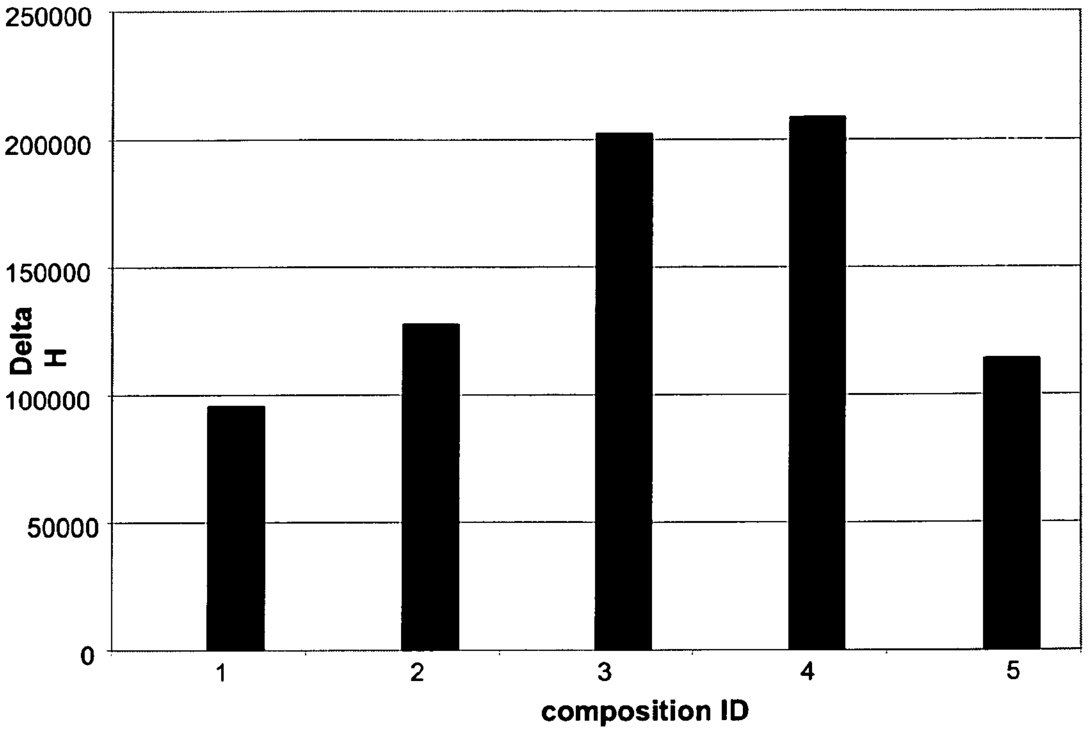
FIG. 4. Enzymatic glucose oxidation in the presence of polydimethylsiloxane (PDMS) copolymers and Perfluorodecalin. The Y axis represents the glucose oxidase activity (Delta H/min) and the X axis represents the identity of the composition. Symbols: 1) no polymer; 2) 15% perfluorodecalin +5% pluronic F 68; 3) 15% DC 1598+5% pluronic F 68; 4) 15% DC Q2-5247+5% pluronic F 68; 5) 15% DC 1248+0.5% PPG P2000

It was of interest to compare the most effective copolymer Q2-5247 with the commercially important oxygen carrier perfluorodecalin. This copolymer improved glucose oxidation by 75% compared to perfluorodecalin (FIG. 4, bars 4 and 2, respectively).

Thus, it has been demonstrated that PDMS copolymers can be an attractive alternative to perflurodecalin, for improving oxygen dependent enzymatic reactions in vitro and in vivo.

Effect of a PDMS Copolymer on Model Bacteria

Figure 5:
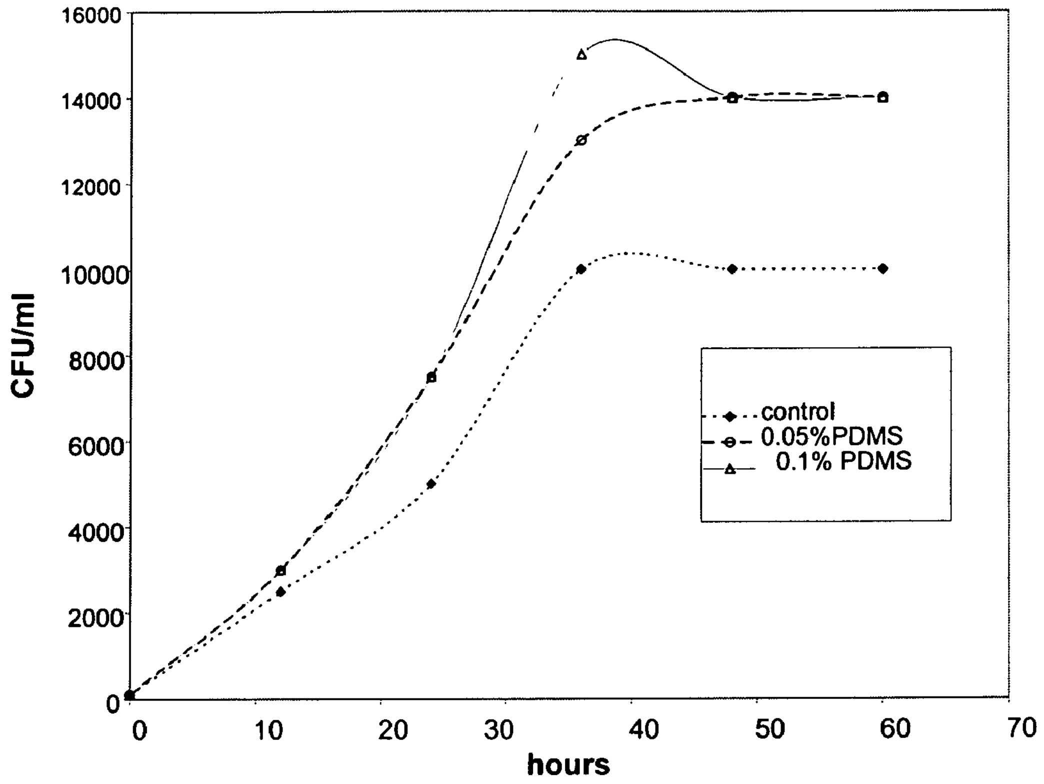
FIG. 5. Growth curve of *Bacillus thuriginensis* with and without DC Q2-5247 added into LB growth medium. The Y axis represents CFU/ml of *Bacillus thuriginensis* (coloni forming units/ml) and the X axis represents the time lapsed (hours). The respective curves represent a control (no copolymer added), 0.05% of PDMS copolymer (Q2-5247) and 0.1% of PDMS copolymer (Q2-5247).

PDMS copolymer marked Q2-5247 was tested for its effect on multiplication of cells by *Bacillus thuriginensis* or antibiotic production by *Streptomyces coelicolor*. In case of the *Bacillus thuriginensis* strain, the optimal final concentration of the PDMS copolymer used was 0.05% (w/w) (FIG. 5.). Higher concentrations were not satisfactory, data not shown here. The model strain was chosen due to the fact that it is a representative anaerobic strain and also that this particular species is a producer of a biopesticide. In this work we have not measured the level of the biopesticide, but one could expect that its level could be also increased. In some cases the improved oxygen solubility is not expressed in the form of an increased mass but in form the of an increased level of metabolites (Ziomek et al., 1991, Elibol 2001). Similar to Elibol (2001), we tested Q2-5247 for its potential to improve the actinorhodin, an antibiotic product by *Streptomyces coelicolor* (A3). The results from the blue-pigmented antibiotic actinorhodin are shown in table 2. In this model study the optimal concentration of the used PDMS polymer, added at the beginning of the culture growth is 0.1% (w/w).

In the microbial system described in the literature, perfluorodecalin as oxygen carrier is more often used than PDMS copolymers, in spite of the fact that it is very expensive and it has to be used in high concentrations in microbial systems to improve a biological process. Moreover, using perfluordecalin to improve fermentation yield, high waste loads are created which might be problematic for the natural bioremediation system.

TABLE 1

The distribution of the main components in the polymerised blocks of the commercially available Dow Corning (DC) polydimethylsiloxanes (PDMS) which were tested with glucose oxidase is shown below.

| Product name | Dimethyl siloxane (%) | E0 (%) | PO (%) | Mw | Viscosity |
|---|---|---|---|---|---|
| DC 1248 | 96 | 0 | 2 | 3100 | 170 |
| DCQ2-5247 | 18 | 35 | 46 | 27900 | 2305 |
| DCQ2-5573 | 19 | 35 | 46 | 58047 | 4450 |
| DC 5604 | 24 | 50 | 26 | 6700 | 300 |
| DC 1598 | 33 | 44 | 23 | 9590 | 548 |
| DC 3581 | 95 | 4 | 1 | 31282 | 7500 |
| DC 3580 | 17 | 1 | 83 | 5105 | 312 |

E0 = ethylene oxide
PO = propylene oxide

TABLE 2

The production of actinorhodin by Streptomyces coelicolor A3 (2) on the protein fraction extract (PFE*) based growth medium without and with addition of PDMS copolymer marked DC Q2-5247. The data are expressed in OD units measured at λ 550 nm followed in the supernatant from the growth culture.

| Sampling time (h) | without PDMS (OD) | 0.1% (w/w) PDMS (OD) | 0.5% (w/w) PDMS (OD) |
|---|---|---|---|
| 60 | 0.11 | 0.20 | 0.13 |
| 84 | 0.12 | 0.33 | 0.17 |
| 132 | 0.13 | 0.31 | 0.17 |
| 156 | 0.27 | 0.36 | 0.24 |

*PFE protein fraction extract

The invention claimed is:

1. A method for supplying oxygen to a water purification process, said method comprising:

a) providing an oxygen carrier of at least one copolymer of dimethylsiloxane, ethylene oxide and propylene oxide;

b) adding said oxygen carrier to the water purification process; and c) contacting said oxygen carrier with an oxygen-containing gas.

2. The method according to claim 1, wherein said copolymer is added as an emulsion, or as a copolymer immobilized on and/or in a support.

3. The method according to claim 2, wherein said support-immobilized copolymer further includes immobilized microorganisms thereon.

4. The method according to claim 2 or 3, wherein said support is selected from the group consisting of organic supports and inorganic supports.

5. The method according to claim 1, wherein said oxygen containing gas is added to the process either continuously or batch-wise.

6. The method according to claim 1, wherein said water purification process comprises aerobic steps and wherein said copolymer is added to said aerobic steps.

7. The method according to claim 1, wherein said at least one copolymer comprises 10-40% by weight of dimethylsiloxane, 20-60% by weight of ethylene oxide, and 10-60% by weight of propylene oxide.

8. The method according to claim 7, wherein said copolymer comprises 15-35% by weight of dimethylsiloxane, 25-45% by weight of ethylene oxide and 20-50% by weight of propylene oxide.

9. Use of at least one copolymer of dimethylsiloxane, ethylene oxide and propylene oxide, as an oxygen carrier in a water purification process.

10. Use according to claim 9, wherein said at least one copolymer comprises 10-40% by weight of dimethylsiloxane, 20-60% by weight of ethylene oxide, and 10-60% by weight of propylene oxide.

11. Use according to claim 10, wherein said copolymer comprises 15-35% by weight of dimethylsiloxane, 25-45% by weight of ethylene oxide and 20-50% by weight of propylene oxide.

* * * * *